(No Model.)

J. H. K. McCOLLUM.
AUTOMATIC AIR PUMP FOR PNEUMATIC TIRES.

No. 598,108. Patented Feb. 1, 1898.

Witnesses
H. S. Young
H. Dennison

Inventor.
J. H. K. McCollum
by
Fetherstonhaugh & Co
Attys

UNITED STATES PATENT OFFICE.

JAMES HARRY KEIGHLY McCOLLUM, OF TORONTO, CANADA, ASSIGNOR, BY DIRECT AND MESNE ASSIGNMENTS, OF THIRTEEN-TWENTIETHS TO REMIGIUS ELMSLEY AND WILLIAM HENRY BROUSE, OF SAME PLACE.

AUTOMATIC AIR-PUMP FOR PNEUMATIC TIRES.

SPECIFICATION forming part of Letters Patent No. 598,108, dated February 1, 1898.

Application filed November 6, 1896. Serial No. 611,235. (No model.)

*To all whom it may concern:*

Be it known that I, JAMES HARRY KEIGHLY MCCOLLUM, electrician, of the city of Toronto, in the county of York, in the Province of Ontario, Canada, have invented certain new and useful Improvements in Automatic Air-Pumps for Pneumatic Tires for Bicycle and other Vehicle Wheels, of which the following is the specification.

My invention relates to improvements in automatic pumps for pneumatic tires of bicycle or other vehicle wheels; and the object of the invention is to design a very simple form of pump which may be operated to pump up the air-tube of the tire automatically to any desired pressure should any air escape and keep it pumped up as the wheel rotates; and it consists, essentially, of a tubular or other suitably-formed passage-way, which is preferably located within the tire and extends, preferably, around the major portion thereof, is connected at one end to the ordinary air-valve, which communicates with the interior of the air-tube and at the other end to the atmosphere, and is so arranged that continued depression of the tire on the ground as the wheel rotates forces the air in the tubular passage-way from the open end along the tube through the valve into the air-tube by compressing it continuously as the wheel rotates, as hereinafter more particularly explained.

Figure 1:
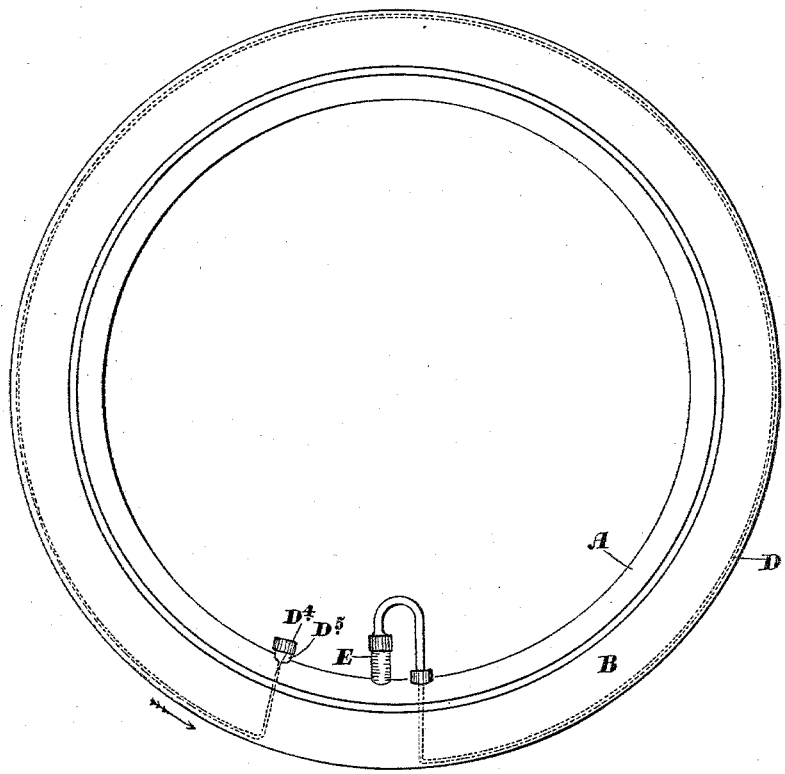
Figure 2:
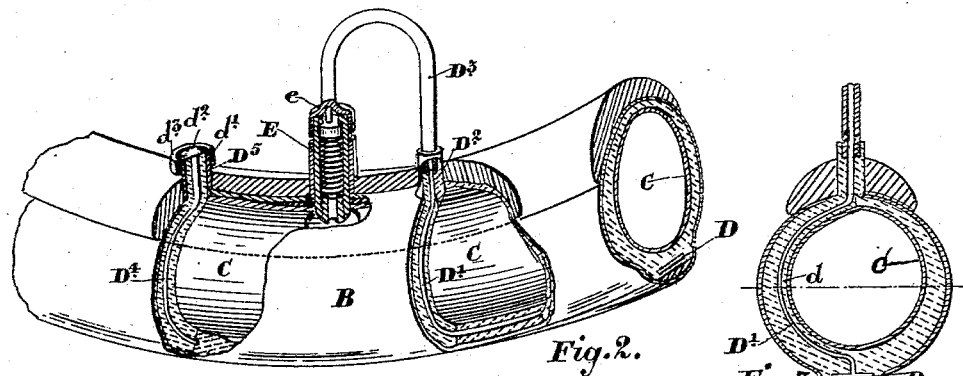
Figure 3:
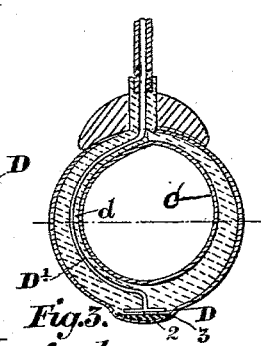
Figure 4:
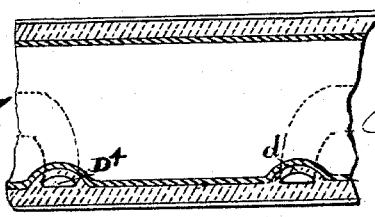

Figure 1 is a side view of a wheel rim and tire, showing in dotted position the preferable location of the tubular passage-way and its connection to the air-valve of the air-tube and to the outer air. Fig. 2 is an enlarged perspective detail of portion of the rim and tire, intermediately broken away to exhibit the peculiar construction and arrangement of the tube and its connections to the air-tube and outer air. Fig. 3 is a cross-section through the rim and tire, showing the passage-way leading across the tire from the outer peripheral passage-way to the tube leading to the air-tube. Fig. 4 is a sectional plan showing the location of both passage-ways leading to the central peripheral passage-way.

In the drawings like letters and numerals of reference indicate corresponding parts in each figure.

A is the rim.

B is the tire proper.

B' is a supplemental envelop to the tire.

C is the air-tube, and E the valve, which is of the ordinary form or such a form as will be perfectly air-tight when closed.

D is a peripheral passage-way, which is made preferably in flat form and is preferably formed in the tire itself near the center of its outer periphery.

D' is a passage-way, also formed in the tire when molded the same as the passage-way D would be and extending from such passage-way D around the cross-sectional arc of the tire, the internal surface thereof forming a raised ridge $d$, sufficiently strong to prevent the compression of the passage-way D' by the pressure of the air-tube against it. The passage-way D extends in the form of a tube $D^2$ through the rim A and has connected to it a tube $D^3$, which connects with top cap $e$ of the valve E, which communicates with and is connected to the interior of the air-tube C in the usual manner. It will thus be seen that one end of the passage-way D ends in the valve E, which communicates with the air-tube. The other end of the passage-way D is connected by a branch passage-way $D^4$, which extends from the passage-way around the cross-sectional arc of the tire B up in tubular form $D^5$ through the rim, where it preferably has a sleeve $d'$ surrounding the end of the tube, over which is preferably placed a thin gauze $d^2$ to prevent the dust from getting into the passage-way, such gauze being secured in position by a cap $d^3$. (See Fig. 2.) The passage-way $D^2$ also is preferably located within the internal surface of the tire, being protected by a ridge $d^4$, molded with the tire and which is of sufficient thickness to prevent the pressure of the air-tube from collapsing the passage-way $D^4$.

The passage-way D may be preferably lined on the outside with leather or any suitable flexible non-puncturable substance or material, or preferably I would place and cement or otherwise fasten a band 2, of leather, light metal, or other suitable substance or material, in a peripheral groove 3 around the entire periphery of the tire directly outside the passage-way, leaving, of course, a sufficient thickness of rubber to form the outer side of the passage-way. This will effectually prevent the passage-way from being punctured under any circumstances.

It will of course be understood that it is necessary to have a certain pressure in the air-tube in order to provide for easy riding. It is therefore necessary, should the pressure in such tube become decreased by leakage or puncture, that in order that the air may be forced through the valve from the inner end of the tubular passage-way the pressure at such end must overcome the pressure of the air in the air-tube upon the valve as well as the pressure of the spring upon the valve. It is therefore compulsory that the size of the passage-way D and the length thereof must be sufficient so that the pressure at the valve end must be increased to pass the valve. This is of course accomplished at each revolution of the wheel as it rotates in the direction indicated by arrow and depresses the portion of the passage-way near the open end first, and by the continuous running depression along the whole of the passage-way the pressure is produced at each revolution near the valve end sufficient to overcome the outward pressure exerted upon such valve and thus forces the air in the passage-way into the air-tube. The amount of pressure of course depends upon the length of the passage-way and its cross-sectional area. When the compression accomplished by the rotation of the wheel and compressing of the passage-way is equal to the pressure of the valve outwardly plus the pressure of the air in such valve from the air-tube—that is to say, when they are in equilibrium—of course there will be no air pumped into the air-tube.

In practice I find that ordinary punctures in the tire will not affect the preserving of the tire at the proper resiliency as long as the rider continues to wheel. The faster he wheels the quicker the pumping will be. It will be seen that this invention will be extremely valuable not only in keeping the air-tube pumped up to the proper pressure, but also should a puncture occur the rider will not have to spend considerable time on the road to repair his tire, but may proceed home with all possible despatch and repair his tire at his leisure.

If the valve used is one with any tendency to leak, of course a faucet might be used outside the valve, which might be closed when the bicycle is not in use.

When the air-tube of the tire is pumped up sufficiently by my device, as hereinbefore described, it will also be understood that such faucet, which would be a three-way one, might be turned in such a manner as to admit the air into both ends of the air passage-way and effectually close the entrance of the valve.

What I claim as my invention is—

1. A pneumatic tire having a circumferential passage located in the tread thereof, lateral branches leading from each end of said passage to the exterior of the tire and a connection between the outer end of one of said branches and the interior of the tire, substantially as described.

2. A pneumatic tire having an automatic air-pump consisting of a compressible passage on its tread portion extending circumferentially thereof, and branch passages located in the wall of said tire leading from said tread-passage to the exterior of the tire and a connection between the outer end of one of said branches and the interior of the tire, substantially as described.

3. The combination with a tire having a central air-space, of a compressible passage located circumferentially outside of the said central air-space, said passage being permanently in communication with the atmosphere and with said central air-space, substantially as described.

JAMES HARRY KEIGHLY McCOLLUM.

Witnesses:
B. BYD,
H. DENNISON.